Figure 1:
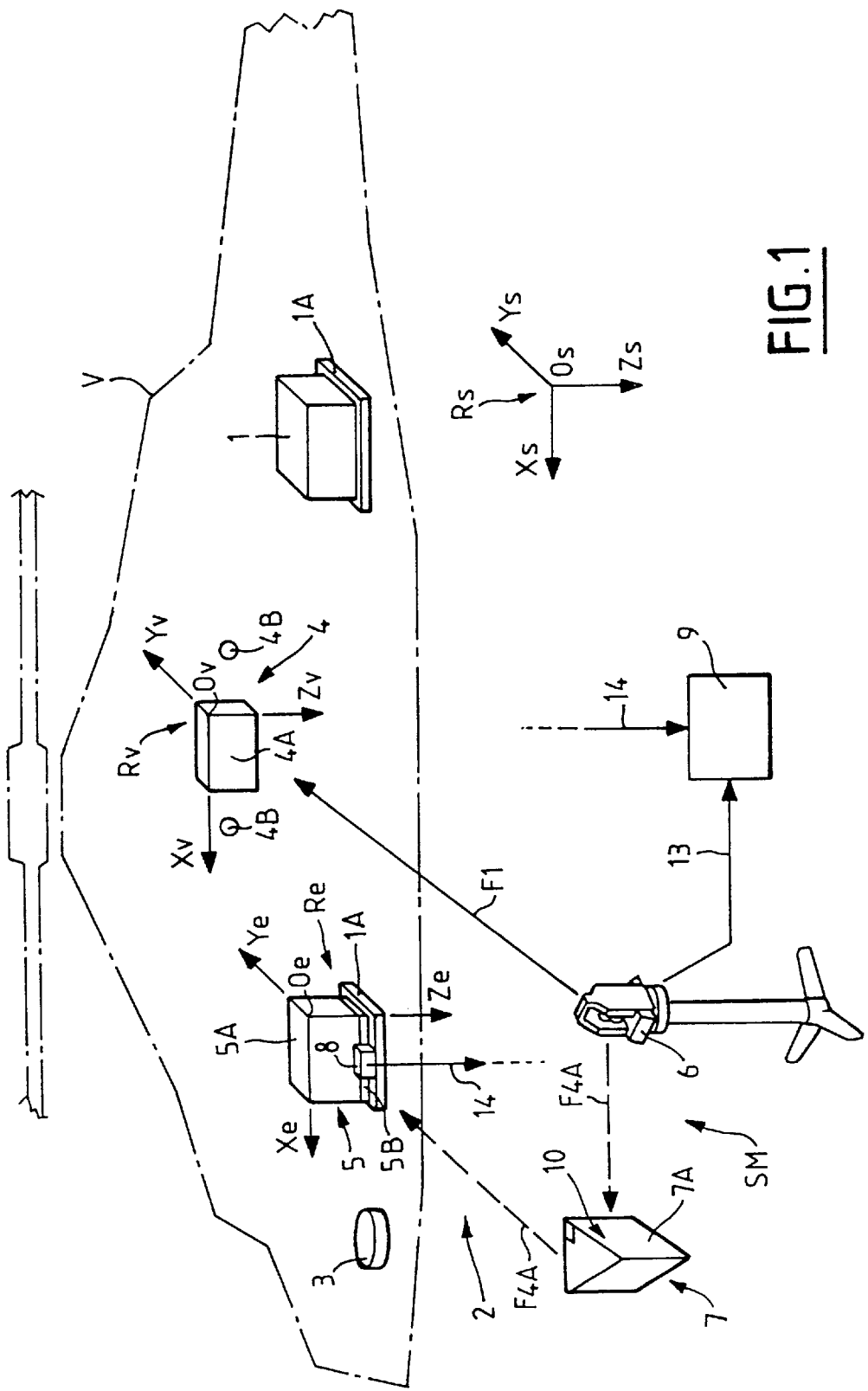

United States Patent [19]

Imbert et al.

[11] Patent Number: 6,014,814
[45] Date of Patent: Jan. 18, 2000

[54] METHOD AND TOOL FOR DETERMINING ON A VEHICLE, ESPECIALLY AN AIRCRAFT, THE HARMONIZATION ERROR OF AN EQUIPMENT ITEM

[75] Inventors: Daniel Henri Adrien Imbert, Marseilles; Jean-Louis Cessi, Marignane, both of France

[73] Assignee: Eurocopter, Cedex, France

[21] Appl. No.: 08/968,608

[22] Filed: Nov. 13, 1997

[30] Foreign Application Priority Data

Nov. 14, 1996 [FR] France .................................. 96 13865

[51] Int. Cl.[7] .......................... G01C 25/00; G01C 15/00
[52] U.S. Cl. .................................................. 33/228; 33/286
[58] Field of Search .......................... 33/228, 227, 286; 356/152.1, 152.2, 152.3

[56] References Cited

U.S. PATENT DOCUMENTS

| | | | |
|---|---|---|---|
| 3,990,796 | 11/1976 | Foltz, Jr. . | |
| 4,483,080 | 11/1984 | Knoll | 33/286 |
| 4,483,618 | 11/1984 | Hamar | 33/286 |
| 4,845,856 | 7/1989 | Rochette | 33/228 |
| 5,007,175 | 4/1991 | Schwarz | 33/228 |

FOREIGN PATENT DOCUMENTS 0 278 825  8/1988  European Pat. Off. .

OTHER PUBLICATIONS

French Search Report dated Jul. 23, 1997, 3 pages.

*Primary Examiner*—Christopher W. Fulton
*Attorney, Agent, or Firm*—Marshall, O'Toole, Gerstein, Murray & Borun

[57] ABSTRACT

The present invention relates to a method and tool for determining on a vehicle (V), especially an aircraft, the harmonization error of an on board equipment item (1) with respect to a vehicle reference frame (Rv). According to the invention, the tool comprises an element (4) representing the vehicle reference frame (Rv), an element (5) arranged at the site of the equipment item and representing said equipment item (1), a theodolite (6) taking measurements on said elements (4, 5), directly or through a prism system (7), an inclination meter (8) measuring the pitching on the second element (5) and a calculator (9) determining the harmonization error from said measurements.

6 Claims, 3 Drawing Sheets

METHOD AND TOOL FOR DETERMINING ON A VEHICLE, ESPECIALLY AN AIRCRAFT, THE HARMONIZATION ERROR OF AN EQUIPMENT ITEM

The present invention relates to a method and tool for determining on a vehicle, especially an aircraft, the harmonization error of an on board equipment item with respect to a vehicle reference frame.

In the context of the present invention, a vehicle reference frame is understood to mean a system of reference axes defined precisely with respect to said vehicle.

It is known that some equipment items fitted on board the vehicle need to occupy fixed precise positions with respect to said vehicle reference frame. These equipment items are, for example, in the case of an aircraft, those intended for navigation, such as an inertial unit, gyros or accelerometers, or alternatively for detection, such as a radar, or alternatively still, for combat, such as weapons and their sighting system. These equipment items are said to need to be "aligned" with the vehicle reference frame and their respective positionings are said to need to be "harmonized".

In the current state of the art, there are essentially two known methods of achieving such alignment.

A first method consists in using setting-up tables made with the desired precision and harmonized. This requires a tool to be positioned precisely with respect to the vehicle and then made to carry out precise machining of the setting-up table, which is then harmonized. This setting-up table then takes two precision-machined centering pegs on which the equipment item will be mounted.

This method, which employs successive transfers of precision of mechanical positioning is cumbersome to use. In particular, it needs as many setting-up tables as there are equipment items to be installed, and these tables also need to have precision-machined fixing means, which increases the cost of using them.

A second method consists in installing the equipment items in adjustable parts of racks, the fixed parts of which are secured to the vehicle. The mechanical alignment of these adjustable parts of the racks (and therefore of said equipment items) occurs during the phase of installing the equipment items on board the vehicle. A method of this kind is generally employed for aligning inertial units mounted on airplanes or helicopters.

This second method requires lengthy and complicated measurements to determine, using reference points integral with the structure of the vehicle and sighting marks or levels, the longitudinal axis of said vehicle and its horizontal reference plane.

The aforementioned two methods of alignment are therefore lengthy, complicated and expensive.

To overcome these drawbacks, French patent FR-A-2 610 101 proposes a more sophisticated solution in which the goal is not, as in the aforementioned methods, to achieve rigorous mechanical alignment of said equipment item with the reference axes of the vehicle. Rather, in this solution, all that is sought is for the harmonization error to be measured and indicated to a computer, which will then be able to carry out axis-change calculations in order to take this harmonization error into account. In a way, the mechanical alignment operations are replaced by computer alignment.

For this, in order to determine the harmonization error, said French patent FR-A-2 610 101 envisages carrying out the following operations:

a) a first reference element that represents said vehicle reference frame and is optically accessible from the outside is placed on board said vehicle sitting on the ground;

b) a second reference element that represents said item of equipment and is optically accessible from the outside is placed on board said vehicle at the site of said item of equipment; and c) using a theodolite-type measurement system arranged at least partially outside the vehicle and taking measurements of said first and second reference elements, the harmonization error of said second reference element that represents the item of equipment with respect to said first reference element which represents the vehicle reference frame is determined.

The harmonization error thus determined is stored in the memory of a computer of the vehicle and is thereafter used by the vehicle to correct, by calculation, the values coming from the equipment item. This method thus avoids having to perform precise mechanical adjustments, the drawbacks of which were mentioned earlier.

To carry out such measurements, this prior document envisages, by way of a theodolite measurement system, a system comprising two theodolites connected together by a computer, and whose measurements by optical sightings are matched to one another.

The drawback of such a measurement system is that it is very expensive, complicated and bulky.

Another solution for carrying out said measurements consists in using just one theodolite which is moved, and in taking measurements for at least two different positions of said theodolite. In this case, it is however necessary to determine, for example by markings on the ground, the exact relative orientation between the two theodolite positions, something which is difficult to achieve and in general leads to significant inaccuracies in the measurements.

The object of the present invention is to overcome these drawbacks. The invention relates to a method for determining quickly, precisely, and inexpensively, the harmonization error of an equipment item on board a vehicle with respect to a vehicle reference frame, said harmonization error being used thereafter to correct the measurements made or data used by said equipment item.

To achieve this, said method which contains steps a), b) and c) mentioned earlier is noteworthy, according to the invention, in that in step c):

the harmonization error in terms of yaw and in terms of roll is determined using measurements made by a single theodolite placed on the ground in such a way that it can take measurements by being capable of sighting both said first reference element and said second reference element, one of said sightings being made directly while the other sighting is made through a prism system; and the harmonization error in terms of pitch is determined using measurements made on said first and second reference elements by the theodolite and by an inclination meter respectively.

Thus, thanks to the use of a prism system:

the implementation of the invention requires just one theodolite, and this in particular makes it possible to reduce the cost and bulk compared to the solution recommended by the aforementioned patent FR-A-2 610 101; and the theodolite can remain in a fixed position to carry out both sets of sightings, and this makes it possible to increase the precision and speed with which the invention can be carried out, compared with the aforementioned solution that recommended that the theodolite be moved.

Advantageously, in step c), the following operations are carried out in turn:

i) using the measurements made by the theodolite on said first reference element, the coordinates of the vehicle reference frame within a ground reference frame within which said theodolite makes its measurements, are determined;

j) from measurements made by the theodolite on said prism system, the coordinates of a prism reference frame that represents said prism system within said ground reference frame are determined;

k) from measurements made on the second reference element by said theodolite and said inclination meter, and from the results of operation j), the coordinates of an equipment reference frame that represents said second reference element within said ground reference frame are determined; and l) from the results of operations i) and k), the coordinates of said equipment reference frame within said vehicle reference frame and which represent said harmonization error, are determined.

In addition, advantageously for the aforementioned operation l):

from the results of operation i), a first matrix for passing from the vehicle reference frame to the ground reference frame is determined;

from the results of operation k), a second matrix for passing from the equipment reference frame to the ground reference frame is determined;

from said first and second matrices, a third matrix for passing from the equipment reference frame to the vehicle reference frame is determined; and the angles which respectively represent the harmonization error of said item of equipment with respect to said vehicle reference frame in terms of yaw, roll and pitch are extracted from said third matrix.

The present invention also relates to a tool for determining on a vehicle, especially an aircraft, the harmonization error between an item of on-board equipment and a system of reference axes of said vehicle forming a vehicle reference frame.

According to the invention, said tooling, which comprises:

a first reference element arranged on board the vehicle, representing said vehicle reference frame and optically accessible from outside;

a second reference element arranged on board the vehicle at the site of the item of equipment representing said item of equipment and optically accessible from outside;

a theodolite-type measurement system taking measurements, by optical sighting, on said first and second reference elements; and a computer for determining said harmonization error from the measurements made by said measurement system, is noteworthy in that said measurement system comprises:

an autocollimated laser theodolite placed on the ground outside the vehicle and capable of taking angle measurements on said first and second reference elements, on one of said reference elements by direct sighting and, on the other reference element by sighting through a prism system;

said prism system placed on the ground; and an inclination meter capable of taking pitch measurements on said second reference element.

Furthermore, advantageously:

said first reference element comprises a planar mirror arranged parallel to the plane formed by the axes of roll and yaw of said vehicle and two sighting marks spaced apart and defining said axis of roll; and/or said second reference element comprises a planar mirror arranged parallel to the plane formed by the axes of roll and yaw of said equipment item and an interface integral with said planar mirror and parallel to the plane formed by the axes of roll and pitch of said equipment item, to receive the inclination meter.

The figures of the appended drawing will make it easy to understand how the invention can be achieved. In these figures, identical references denote similar elements.

FIG. 1 diagrammatically illustrates a tool in accordance with the invention.

Figure 2:
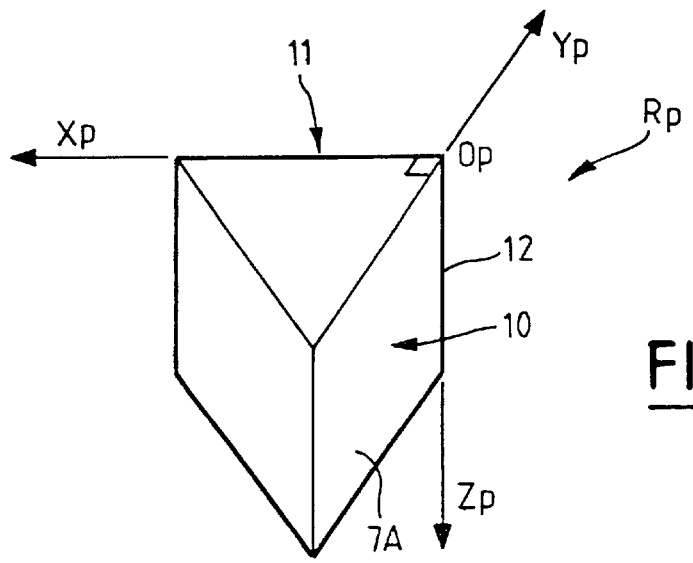

FIG. 2 shows a perspective view of a prism of the tool of FIG. 1.

Figure 3:
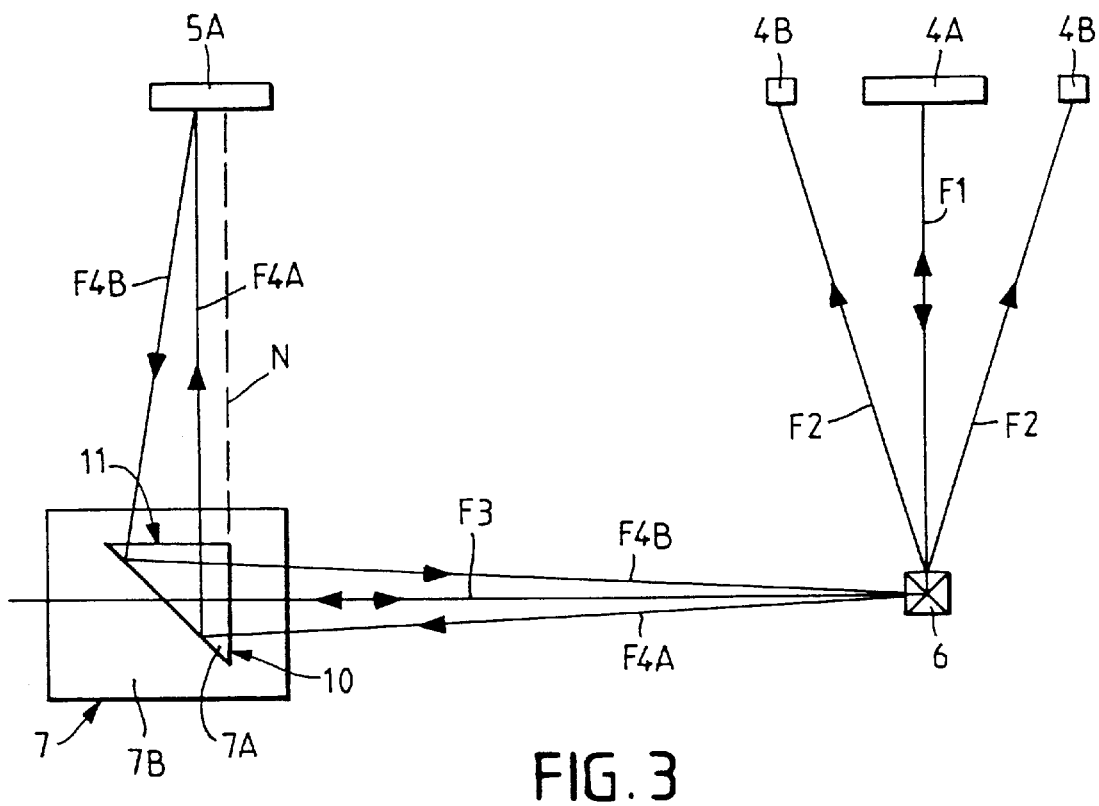

FIG. 3 diagrammatically illustrates the implementation of the invention using the tool of FIG. 1.

Figure 4:
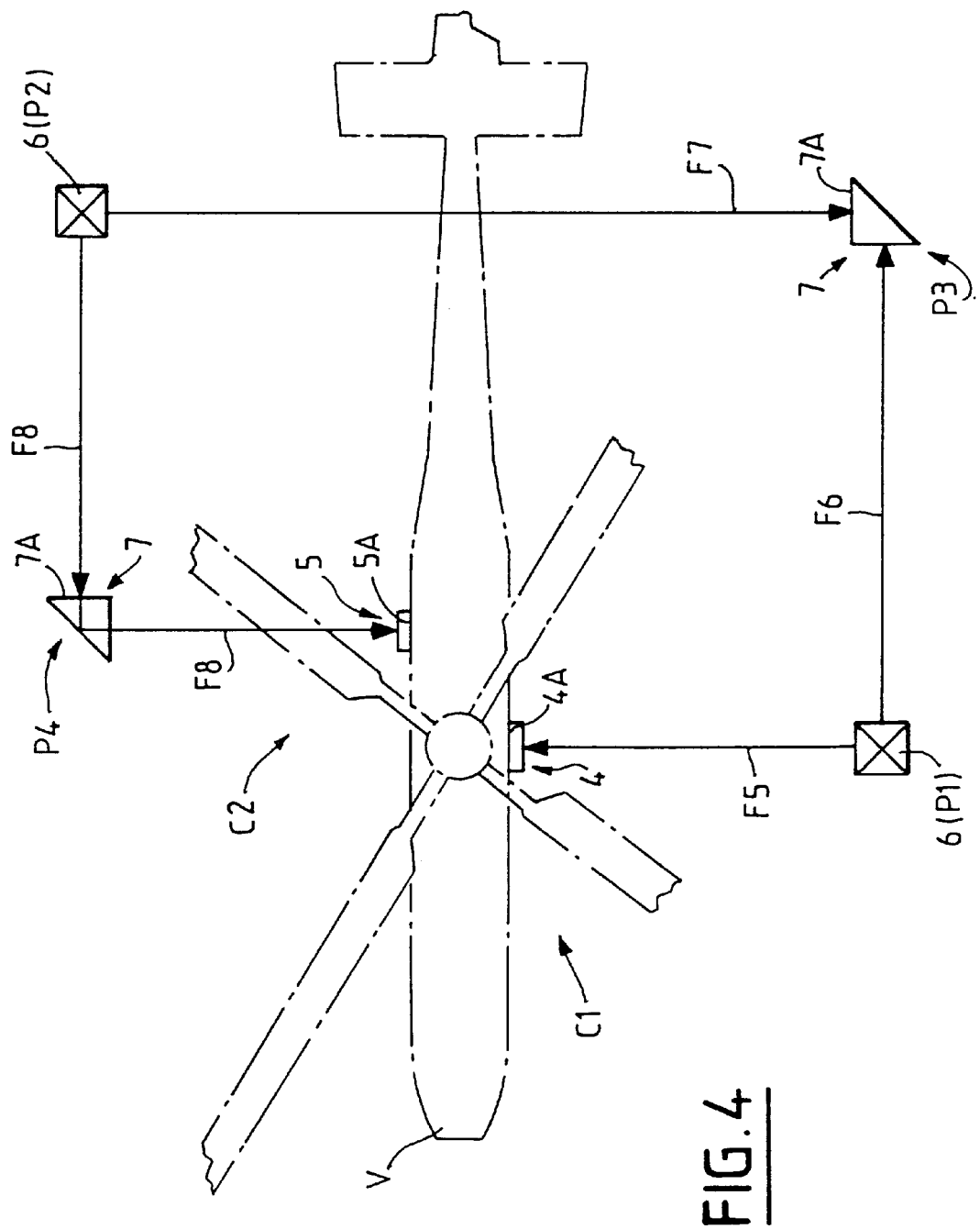

FIG. 4 shows one embodiment of the invention on a vehicle comprising an equipment item and vehicle reference frame which are situated on two opposite sides of said vehicle.

Depicted diagrammatically in FIG. 1, in chain line, is the silhouette of a helicopter that represents the vehicle V to which the present invention is applied. Mounted on board this helicopter V are a number of items of equipment 1 which are arranged on setting up tables 1A and which need to occupy fixed and precise positions with respect to a system of reference axes $OvXv$, $OvYv$, $OvZv$ associated with said helicopter V and forming a vehicle reference frame Rv.

Said vehicle reference frame Rv is preferably defined as follows:

Ov is a fixed point;

OvXv illustrates the longitudinal axis situated in the plane of symmetry (not depicted) of the helicopter V and oriented forward, that is to say the axis of roll;

OvYv illustrates a transverse axis orthogonal to the plane of symmetry and oriented to the right of the helicopter V, that is to say the axis of pitch; and OvZv illustrates the axis of the plane of symmetry orthogonal to the axis OvXv and oriented downward, that is to say the axis of yaw.

Said items of equipment 1, just one of which has been depicted in FIG. 1, are, for example, for an aircraft, those intended for navigation, such as an inertial unit, gyros or accelerometers, or alternatively for detection, such as a radar, or alternatively still, for combat, such as weapons and their sighting system.

Associated respectively with said equipment items 1 are systems of reference axes $OeXe$, $OeYe$, $OeZe$ forming equipment reference frames Re, in which, as appropriate, said equipment items 1 make their measurements.

Also depicted in FIG. 1 is a tool 2 in accordance with the invention, which is intended to determine, for each of said equipment items 1, the harmonization error of the corresponding equipment item with respect to said vehicle reference frame Rv, that is to say the misalignment of the axes OeXe, OeYe, OeZe with respect to the axes OvXv, OvYv, OvZv, respectively.

The results determined by the tool 2 are used, during flight and use of the equipment, to correct the existing harmonization errors and obtain precise measurements which are harmonized between the various equipment items and with respect to the vehicle reference frame Rv.

For this, the harmonization errors determined by the tool 2 in accordance with the invention can be recorded in a memory or a computer 3 on board the vehicle V and which automatically in real time makes corrections to the measurements made or data used by the equipment items 1.

In the known way, to determine said harmonization errors:

a) a first reference element 4 that represents said vehicle reference frame Rv and is optically accessible from the outside is placed on board said vehicle V sitting on the ground;

b) a second reference element 5 that represents said item of equipment and is also optically accessible from the outside is placed on board said vehicle V at the site of an equipment item to be analyzed (on its setting-up table 1A) which has been removed and which is, for example, identical to the equipment item 1; and c) using a measurement system SM arranged at least partially outside the vehicle V and taking measurements on said first and second reference elements 4 and 5, the harmonization error of said second reference element 5 that represents the item of equipment with respect to said first reference element 4 which represents the vehicle reference frame Rv is determined.

According to the invention, said tooling 2, which is formed of said first and second reference elements 4 and 5 and of said measurement system SM, has the following features:

said first reference element 4 comprises a rectangular planar mirror 4A representing the plane OvXvZv and two sighting marks 4B defining the axis OvXv. As a preference, the mirror 4A is mounted permanently on the vehicle V when it is produced, and the sighting marks 4B are put in place when the invention is implemented;

said second reference element 5 comprises a rectangular planar mirror 5A representing the plane OeXeZe and arranged on the setting-up table 1A of the removed item of equipment 1 via an interface 5B parallel to the plane OeXeYe; and said measurement system SM comprises a theodolite 6, a prism system 7, an inclination meter 8 and a computer 9.

It will be noted that, according to the invention:

said theodolite 6 is a theodolite, preferably an electronic one, with laser autocollimation, which takes angular measurements in a system of reference axes OsXs, OsYs, OsZs forming a ground reference frame Rs. The axis OsZs represents the terrestrial vertical and the plane OsXsYs represents the terrestrial horizontal plane. Said theodolite 6 is placed on the ground facing said first reference element 4;

the prism system 7 comprises a prism 7A arranged, in the way explained below, facing said second reference element 5 so that said theodolite 6 can sight this second reference element 5 through said prism 7A. For reasons of clarity of the drawing, only the prism 7A of said prism system 7 has been depicted in FIG. 1. A prism reference frame Rp formed of axes OpXp, OpYp and OpZp and depicted in FIG. 2 is associated with said prism system 7. As can be seen in FIGS. 1 and 2, said prism 7A has two faces 10 and 11 which are orthogonal along a solid angle of intersection 12 and it is arranged in such a way that one 10 of said faces is more or less orthogonal to the sighting line F3 of the theodolite 6 and so that the other face 11 is more or less parallel to the plane OeXeZe of the mirror 5A (as illustrated by a common normal N in FIG. 2). In this case, the axis OpXp is orthogonal to the face 10, the axis OpZp is parallel to the solid angle of intersection 12 and the axis OpYp completes the trihedron;

the inclination sensor 8, of a known type, is mounted on the interface 5B of said second reference element 5 and measures the harmonization error of the equipment item in terms of pitch within the ground reference frame Rs; and the computer 9, for example a personal computer, using calculations specified below, determines the sought-after harmonization errors from the measurements made by the theodolite 6 and the inclination sensor 8. To do this, said measurements may be input into said computer 9 either manually or automatically via links 13 and 14.

To implement the invention, the following operations were carried out in succession, using the tooling 2 explained above:

an autocollimated sighting of the mirror 4A is made with said theodolite 6 as illustrated by a sighting line F1 in FIG. 3, and a sighting on each of the sighting marks 4B is made, as illustrated by sighting lines F2;

using the measurements from the earlier sightings, the yaw angle $\psi v/s$, pitch angle $\Theta v/s$ and roll angle $\phi v/s$ of the vehicle V in the ground reference frame Rs and the matrix [M1] for passing from the vehicle reference frame Rv to the ground reference frame Rs are calculated in the known way, this matrix representing the usual matrix of corresponding Euler angles;

the theodolite 6 is swivelled through 90° and the prism 7A is sighted, which prism is arranged, on a mobile support 7B, in a way indicated earlier so that its face 10 is orthogonal to the sighting line F3 of the theodolite 6 and so that its face 11 is parallel to the mirror 5A, give or take the corresponding harmonization error. In the same way, an autocollimated sighting on the face 10 and sightings on two sighting marks, not depicted and representing the axis OpYp, are taken;

using the measurements of the earlier sightings, the matrix [M2] for passing from the prism reference frame Rp to the ground reference frame Rs is determined in the same way as was used before for determining the matrix [M1];

using the theodolite 6, the mirror SA is sighted through the prism 7A, as illustrated by a sighting line F4A and an associated sighting line F4B after reflection off the mirror SA;

from the measurements of the earlier sighting and the matrix [M2] the angle of yaw $\psi e/s$ and the angle of roll $\phi e/s$ of the equipment reference frame Re (i. e. of the equipment item) within the ground reference frame Rs are determined;

using the inclination meter 8, the angle of pitch $\Theta e/s$ of the equipment reference frame Re (i. e. of the equipment item) within the ground reference frame Rs is measured;

from the angles $\psi e/s$, $\phi e/s$ and $\Theta e/s$ thus determined, the matrix [M3] for passing from the equipment reference frame Re to the ground reference frame Rs is calculated;

from the matrices [M1] and [M3], the matrix [M4] for passing from the equipment reference frame Re to the vehicle reference frame Rv is determined; and from said matrix [M4], the angles $\psi e/v$, $\Theta e/v$ and $\phi e/v$ that represent the sought-after harmonization error angles in terms of yaw, pitch and roll, respectively, are deduced.

When the first reference element 4 is fixed to one side C1 of the vehicle V and the equipment item whose harmonization error is to be determined is situated on the other side C2, as depicted in FIG. 4, sightings (and measurements) are taken for two different positions P1 and P2 of the theodolite 6.

For a first position P1 facing said first reference element 4, the same operations as before are carried out using a first prism system 7 arranged at a position P3 so that the sighting lines F5 and F6 of the theodolite 6 on the mirror 4A and on the prism 7A, respectively, are more or less orthogonal.

The theodolite 6 is then moved to a position P2 on the other side C2 of the vehicle V, this position being more or less symmetric with the position P3 of the prism 7A with respect to the plane of symmetry, not depicted, of the vehicle V, and sightings are taken:

on said first prism system 7 situated at the position P3, as illustrated by a sighting line F7; and on a second prism system 7 situated at a position P4 facing the mirror 5A, as illustrated by a sighting line F8.

The prism 7A of said second prism system 7 is arranged in such a way that it sends the beam from the theodolite 6, illustrated by the sighting line F8, onto the mirror 5a in such a way that the theodolite 6 can make the necessary measurements.

The measurements and calculations carried out in this particular instance are done in the same way as those in the embodiments described earlier with reference to FIGS. 1 and 3. Thus reference will be made to the corresponding description in order to understand how the invention is implemented in this particular example.

It will moreover be noted that according to the invention, harmonization can be achieved irrespective of the position of the vehicle on the ground (absence of leveling).

We claim:

1. A method for determining on a vehicle (V), especially an aircraft, the harmonization error between an item of on board equipment (1) and a system of reference axes of said vehicle (V) forming a vehicle reference frame (Rv), which method has the following steps:

a) a first reference element (4) that represents said vehicle reference frame (Rv) and is optically accessible from the outside is placed on board said vehicle (V) sitting on the ground;

b) a second reference element (5) that represents said item of equipment (1) and is optically accessible from the outside is placed on board said vehicle (V) at the site of said item of equipment (1); and c) using a theodolite-type measurement system (SM) arranged at least partially outside the vehicle (V) and taking measurements of said first and second reference elements (4, 5), the harmonization error of said second reference element (5) that represents the item of equipment (1) with respect to said first reference element (4) which represents the vehicle reference frame (Rv) is determined, wherein, in step c):

the harmonization error in terms of yaw and in terms of roll is determined using measurements made by a single theodolite (6) placed on the ground in such a way that it can take measurements by being capable of sighting both said first reference element (4) and said second reference element (5), one of said sightings being made directly while the other sighting is made through a prism system (7); and the harmonization error in terms of pitch is determined using measurements made on said first and second reference elements (4, 5) by the theodolite (6) and by an inclination meter (8) respectively.

2. The method as claimed in claim 1, wherein, in step c), the following operations are carried out in turn:

i) using the measurements made by the theodolite (6) on said first reference element (4), the coordinates of the vehicle reference frame (Rv) within a ground reference frame (Rs) within which said theodolite (6) makes its measurements, are determined;

j) from measurements made by the theodolite (6) on said prism system (7), the coordinates of a prism reference frame (Rp) that represents said prism system (7) within said ground reference frame (Rs) are determined;

k) from measurements made on the second reference element (5) by said theodolite (6) and said inclination meter (8), and from the results of operation j), the coordinates of an equipment reference frame (Re) that represents said second reference element (5) within said ground reference frame (Rs) are determined; and l) from the results of operations i) and k), the coordinates of said equipment reference frame (Re) within said vehicle reference frame (Rv) and which represent said harmonization error, are determined.

3. The method as claimed in claim 2, wherein, in operation l):

from the results of operation i), a first matrix for passing from the vehicle reference frame (Rv) to the ground reference frame (Rs) is determined;

from the results of operation k), a second matrix for passing from the equipment reference frame (Re) to the ground reference frame (Rs) is determined;

from said first and second matrices, a third matrix for passing from the equipment reference frame (Re) to the vehicle reference frame (Rv) is determined; and the angles which respectively represent the harmonization error of said item of equipment (1) with respect to said vehicle reference frame (Rv) in terms of yaw, roll and pitch are extracted from said third matrix.

4. A tool for determining on a vehicle (V), especially an aircraft, the harmonization error between an item of on-board equipment (1) and a system of reference axes of said vehicle (V) forming a vehicle reference frame (Rv), said tool (2) comprising:

a first reference element (4) arranged on board the vehicle (V), representing said vehicle reference frame (Rv) and optically accessible from outside;

a second reference element (5) arranged on board the vehicle (V) at the site of the item of equipment (1) representing said item of equipment (1) and optically accessible from outside;

a theodolite-type measurement system (SM) taking measurements, by optical sighting, on said first and second reference elements (4, 5); and a computer (9) for determining said harmonization error from the measurements made by said measurement system (SM), wherein said measurement system (SM) comprises:

an autocollimated laser theodolite (6) placed on the ground outside the vehicle (V) and capable of taking angle measurements of said first and second reference elements (4, 5), on one (4) of said reference elements by direct sighting and, on the other reference element (5) by sighting through a prism system (7);

said prism system (7) placed on the ground; and an inclination meter (8) capable of taking pitch measurements on said second reference element (5).

5. The tool as claimed in claim 4, wherein said first reference element (4) comprises a planar mirror (4A) arranged parallel to the plane formed by the axes of roll (OvXv) and yaw (OvZv) of said vehicle (V) and two sighting marks spaced apart and defining said axis of roll (OvXv).

6. The tool as claimed in claim 4, wherein said second reference element (5) comprises a planar mirror (5A) arranged parallel to the plane formed by the axes of roll (OeXe) and yaw (OeZe) of said equipment item (1) and an interface (5B) integral with said planar mirror (5A) and parallel to the plane formed by the axes of roll (OeXe) and pitch (OeYe) of said equipment item (1), to receive the inclination meter (8).

* * * * *